May 18, 1965 R. E. OVENDEN ETAL 3,184,606

FREQUENCY RESPONSIVE DEVICE WHEREIN OUTPUT IS PRODUCED WHEN PULSES IN PULSE-TRAIN EXCEED STANDARD PULSE-WIDTH

Filed April 26, 1962

2 Sheets-Sheet 1

Inventors:
Raymond Edward Ovenden
Robert Frederick Stanley Powner
By Karl W. Flocks
Attorney Inventors:
Raymond Edward Ovenden
Robert Frederick Stanley Powner
By Karl W. Flocks
Attorney

United States Patent Office 3,184,606

Patented May 18, 1965

3,184,606

FREQUENCY RESPONSIVE DEVICE WHEREIN OUTPUT IS PRODUCED WHEN PULSES IN PULSE-TRAIN EXCEED STANDARD PULSE-WIDTH

Raymond Edward Ovenden, St. Albans, and Robert F. S. Towner, Colney Heath, England, assignors to The De Havilland Aircraft Company Limited, Hatfield, Hertford, England, a company of Great Britain Filed Apr. 26, 1962, Ser. No. 190,474
Claims priority, application Great Britain, April 27, 1961, 15,334/61
7 Claims. (Cl. 307—88.5)

This invention relates to improvements in frequency responsive devices.

It is an object of the present invention to provide an improved frequency responsive device which shall be capable of responding to the frequency of an electric input signal to provide an electric output signal when the frequency of the input signal departs from a predetermined relationship with a selected frequency, the output signal being capable of being used to operate a warning or alarm device or to control means for modifying the frequency of the input signal to oppose the departure thereof from said predetermined relationship.

According to the present invention, a frequency responsive device comprises means responsive to the frequency of an electric input signal to produce a pulse train the pulses of which have a width or duration which is a function of the input frequency and means responsive to the departure of said pulse width or duration from a predetermined relationship with a selected value to produce an electric output signal.

According to a preferred embodiment of the invention a frequency responsive device comprises means responsive to the frequency of an electric input signal to derive trigger signals operable to control a bistable device to produce two trains of pulses the pulse length or duration of the pulses of which is a function of the frequency of the input signal, means responsive to the termination of each pulse of one pulse train to produce a reference pulse having a selected width or duration and means responsive to the departure of the pulse width or duration of each pulse of the other pulse train from a predetermined relationship with the width or duration of the reference pulse to produce an electric output signal.

Advantageously, the reference pulse producing means comprises means responsive to the termination of each pulse of the one pulse train to trigger a monostable device from which the reference pulse is derived.

Conveniently, an electric switch is provided responsive to the output signal to complete a circuit to a warning or alarm system or to control means for modifying the frequency of the input signal in the sense to oppose the departure of the pulse width or duration of the pulses of said other pulse train from said predetermined relationship with the width or duration of the reference pulse.

Desirably, the switch embodies a silicon controlled rectifier.

One embodiment of the invention will now be described by way of example, reference being made to the accompanying drawings in which.

Figure 1:
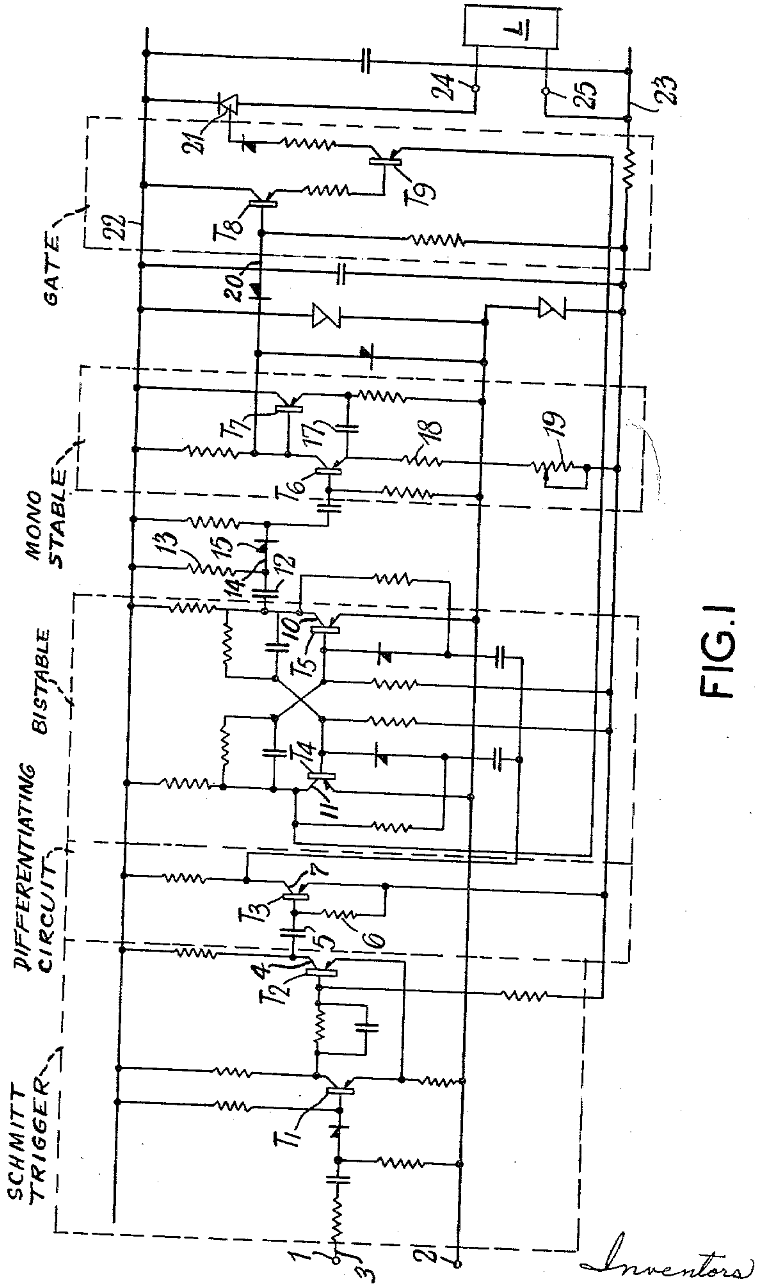
FIG. 1 is a circuit diagram of a device according to the invention.
Figure 2:
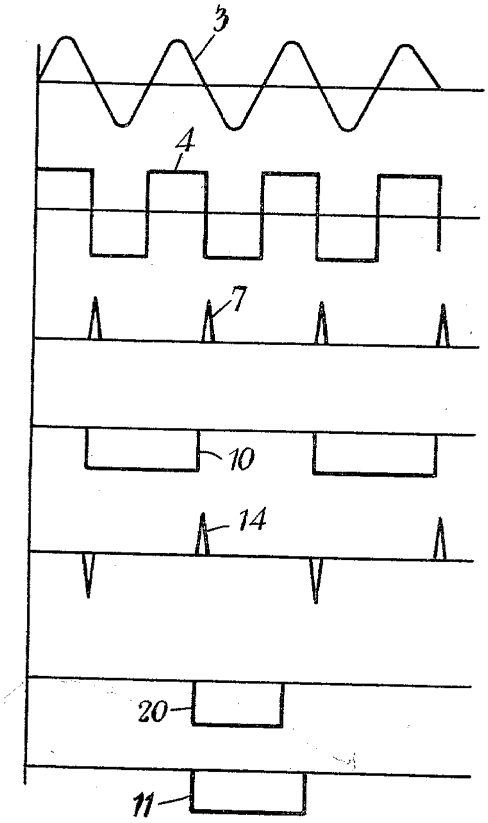
FIG. 2 is a diagram illustrating various waveforms which occur in the device of FIG. 1.

The device of this example comprises a Schmitt trigger circuit embodying transistors $T_1$ and $T_2$ to which an electric input signal is supplied by way of input terminals 1 and 2. For the purposes of this example, the input signal is assumed to be sinusoidal as shown at 3 in FIG. 2, but it will be appreciated that the input signal need not be sinusoidal. The Schmitt trigger circuit produces a square wave output as shown at 4 in FIG. 2 having a repetition frequency corresponding to the frequency of the input signal 3. The square wave output 4 derived from the collector electrode of the transistor $T_2$ is supplied to the base circuit of a transistor $T_3$ which has a capacitor 5 in the base circuit and a resistor 6 connected between the base and emitter electrodes. The capacitance of the capacitor 5 and the impedance of the transistor $T_3$ serve to differentiate the square wave output 4. The positive differentiated pulses make the transistor $T_3$ non-conducting and the negative differentiated pulses make it conduct to provide positive trigger pulses 7 (FIG. 2) at the collector electrode which are supplied to a bistable circuit incorporating transistors $T_4$ and $T_5$. One trigger pulse 7 of one polarity causes the bistable device to assume one condition and the next such trigger pulse 7 causes the bistable device to assume the other condition to produce one train of pulses 10 (FIG. 2) at the collector electrode of the transistor $T_5$ and a similar train of pulses 11 (FIG. 2) at the collector electrode of the transistor $T_4$, the pulses in each train having a width or duration which is a function of the frequency of the input signal 3. The pulses 11 occur during the interval between the pulses 10. The pulses 10 are differentiated by a capacitor 12 and resistor 13 to provide further trigger pulses 14 (FIG. 2) of which the negative-going trigger pulses are removed by a rectifier 15. This leaves the positive going trigger pulses 14 which are applied to a monostable circuit embodying transistors $T_6$ and $T_7$ and which includes a capacitor 17 and resistors 18 and 19 in the emitter circuit of the transistor $T_6$. The capacitor 17 and resistors 18 and 19 control the period for which the mono-stable circuit conducts on receipt of each positive-going trigger pulse 14, this period being selected to be less than that width or duration of the pulses 10 and 11 corresponding to a selected minimum input signal frequency. The output from the mono-stable circuit is a pulse train, the pulses 20 (FIG. 2) of which have a constant width or duration determined by the values selected for the capacitor 17 and resistors 18 and 19. The pulses 20 of fixed duration are supplied to the base electrode of a transistor $T_8$ which, together with a further transistor $T_9$, forms a super alpha connection. The pulses 11 are supplied to the emitter electrode of the transistor $T_9$ and the transistors $T_8$ and $T_9$ operate as a gate which will produce an output signal only when the width or duration of a pulse 20 exceeds that of a pulse 11 and therefore only when the frequency of the input signal 3 exceeds a predetermined value. This output signal is arranged to switch on a silicon controlled rectifier 21 which is connected across supply lines 22 and 23 in series with a load L connected across terminals 24 and 25. The load L may take the form of a warning or alarm device. The silicon controlled rectifier 21 can only be reset by switching off the supply across lines 22 and 23.

The device described is of particular, but not exclusive, application to aircraft and may be used to provide a warning or alarm when the frequency of the input signal, derived as a function of engine speed, exceeds a predetermined value.

It will be appreciated that the silicon controlled rectifier switch 21 may be replaced by a device which will switch off when the frequency of the input signal no longer exceeds the predetermined value and the load may take the form of means for modifying the frequency of the input signal in the sense to reduce it when it exceeds the predetermined value.

It will also be appreciated that the circuit described may be modified to produce an output signal from the transistors $T_8$ and $T_9$ when the width or duration of the pulses 11 exceeds that of pulses 20, i.e. when the frequency of the input signal 3 falls below a predetermined value.

What we claim is:

1. A frequency responsive device comprising means responsive to the frequency of an electric input signal to derive trigger signals operable to control a bistable device to produce two trains of pulses the pulse length or duration of the pulses of which is a function of the frequency of the input signal, a monostable device responsive to the termination of each pulse of one pulse train to produce a reference pulse having a selected width or duration, a transistor circuit comprising a pair of transistors forming a super alpha connection, each transistor having a base electrode, a collector electrode and an emitter electrode, means for applying each reference pulse to the base electrode of one of said transistors, means for applying the pulse of the other of said two pulse trains to the emitter electrode of the other of said pair of transistors to derive from said transistor circuit an output signal when the duration of said reference pulse exceeds the duration of a pulse in said other pulse train, a load, and switch means responsive to said output signal to complete the circuit to said load.

2. A frequency responsive device comprising means responsive to the frequency of an electric input signal to derive trigger signals operable to control a bistable device to produce two trains of pulses the pulse length or duration of the pulses of which is a function of the frequency of the input signal, means responsive to the termination of each pulse of one pulse train to produce a reference pulse having a selected width or duration and means responsive to the departure of the pulse width or duration of each pulse of the other pulse train from a predetermined relationship with the width or duration of the reference pulse to produce an electric output signal.

3. A device according to claim 2 wherein the reference pulse producing means comprises means responsive to the termination of each pulse of the one pulse train to trigger a mono-stable device from which the reference pulse is derived.

4. A device according to claim 2 wherein the electric output signal producing means comprises a transistor circuit supplied with said other pulse train and said reference pulse and operable to provide said output signal when the duration of said reference pulse exceeds the duration of a pulse in said other pulse train.

5. A device according to claim 4 wherein said transistor circuit comprises a pair of transistors forming a super alpha connection, each transistor having a base electrode, a collector electrode and an emitter electrode, said transistor circuit having the reference pulses applied to the base electrode of one of said transistors and the pulses of said other pulse train being applied to the emitter electrode of the other transistor.

6. A device according to claim 2 wherein an electric switch is provided responsive to the output signal to complete a circuit to a load.

7. A device according to claim 6 wherein the switch comprises a silicon controlled rectifier connected in series with said load.

References Cited by the Examiner

UNITED STATES PATENTS 2,900,532 8/59 Barnes .............. 307—88.5

ARTHUR GAUSS, *Primary Examiner.*

GEORGE N. WESTBY, *Examiner.*